F. M. LA BOITEAUX,
TUBING FOR AUTOMOBILE RADIATORS AND OTHER PURPOSES.
APPLICATION FILED JAN. 16, 1918.

1,318,210.

Patented Oct. 7, 1919.

Inventor
Frank M. La Boiteaux,

Witnesses

By
Attorney

UNITED STATES PATENT OFFICE.

FRANK M. LA BOITEAUX, OF CINCINNATI, OHIO, ASSIGNOR OF ONE-HALF TO C. G. BUCHANAN, OF CINCINNATI, OHIO.

TUBING FOR AUTOMOBILE-RADIATORS AND OTHER PURPOSES.

1,318,210.  Specification of Letters Patent.  Patented Oct. 7, 1919.

Application filed January 16, 1918. Serial No. 212,106.

*To all whom it may concern:*

Be it known that I, FRANK M. LA BOITEAUX, a citizen of the United States, residing at Cincinnati, in the county of Hamilton and State of Ohio, have invented new and useful Improvements in Tubings for Automobile-Radiators and other Purposes, of which the following is a specification.

This invention relates to tubing for automobile radiators for cooling internal combustion engines, silencers or mufflers, heaters and steam coils and other uses where it may be applicable, and in the use of the tubing in automobile radiators the objects are to provide the necessary expansion to prevent bursting when frozen; to provide a larger exposed surface for cooling by causing different portions of the water to be confined close to the surface of the tubing and insure a more efficient and rapid reduction in temperature of the water; and to provide such a degree of flexibility as to prevent loosening of joints due to vibration. In the use of the device as a silencer or muffler, the object is to provide a construction that will effectively deaden sound by changing the direction of flow of the exhaust therethrough a large number of times. In the use of the device in steam and heater coils, the object is to present the water throughout the length of the tubing to a greater surface in materially reduced and confined volume at various points and thereby more quickly and efficiently heat the water and also generate steam.

The invention consists essentially of a tubing of any suitable length and diameter which is indented alternately in planes at right angles throughout the length thereof to produce reduced passages for the water through the tubing, the ends of the tubing being preferably preserved in circular contour in cross-section for convenience in attachment or mounting in connection with heads, chambers and other devices to which the tubing may be applied.

In the drawings:—

Figure 1:
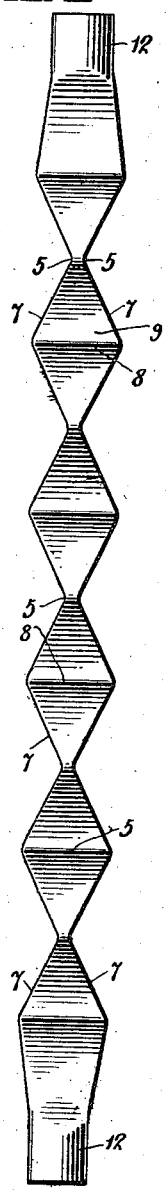
Figure 1 is an elevation of a tubing embodying the features of the invention.
Figure 3:
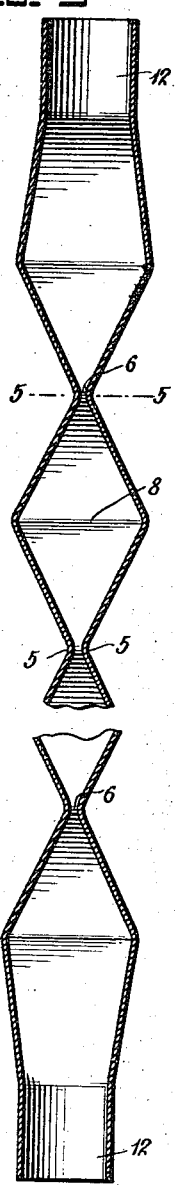
Fig. 3 is a central section through the tubing as shown by Fig. 2.
Figure 2:
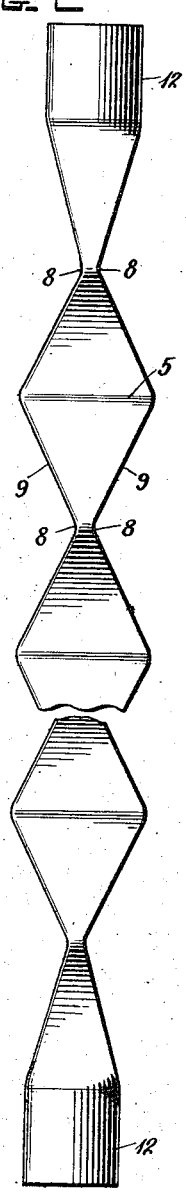
Fig. 2 is a view similar to Fig. 1 on a larger scale, of a portion of the tubing and showing the same in planes at right angles to that shown by Fig. 1.
Figure 4:
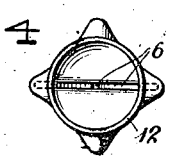
Fig. 4 is an end elevation of the tubing.
Figure 5:
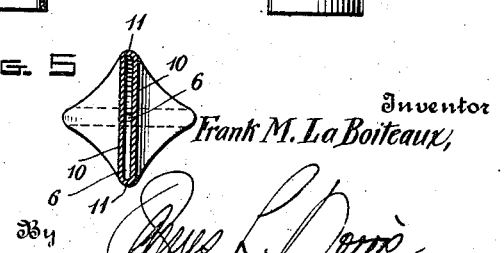
Fig. 5 is a transverse vertical section taken in the plane of the line 5—5, Fig. 3.

The improved tubing is constructed of metal having a suitable thickness and is of a length and diameter proportionate to the particular use thereof as may be desired. The tubing is indented at diametrically opposite points, as at 5, to provide contracted passages 6 and from the indentations 5 the body of the tube slopes or inclines outwardly in opposite directions, as at 7, to indentations 8 in planes at right angles to the indentations 5, the tube again sloping or inclining outwardly in reverse directions, as at 9, from the said indentations 8. The indentations 5 and 8 and the outwardly sloping or inclined portions or sides 7 and 9 are of similar dimensions throughout the length of the tubing and the said indentations are also of equal depth, the indentations standing in planes at right angles in alternation as shown by full and dotted lines in Fig. 5. As shown by Fig. 5 also, the side walls 10 of the indentations are parallel and the ends 11 thereof are rounded and by this means a narrow passage is formed which will bring the water in confined volume close to the surfaces of the tubing provided by the said indentations. The ends 12 of the tubing are circular in cross-section to adapt the same to the ordinary fittings of radiators, heaters and pipe connections.

The water or the exhaust gases or steam passing through the improved tubing will be deflected alternately at different angles throughout the length of the tubing and, in the case of water, either in cooling or heating the same, a circulation ensues which will bring different portions of the water in confined volume against the flat surfaces of the bends and thereby more efficiently expose the water either for cooling or heating purposes. When the tubing is used as a silencer or muffler, the exhaust gases or steam in passing therethrough are alternately diverted by many angular passages and thereby materially deaden the sound and, in fact, deprive the exhaust of all sound due to the tortuous course it is compelled to take through the tubing.

When the tubing is used in radiators for automobiles, it is obvious that the spaces formed in planes at right angles to each other by the construction of the indentations 5 and 8 will produce air circulating openings and the lengths of tubing may be readily disposed in close relation so as to provide for a large exposure of the water by means of the tubing components constructed in accordance with the features of the invention mounted in a radiator. Likewise, in water radiators, the air is permitted to circulate freely between the lengths of tubing of which such radiator will be composed and be thereby quickly heated by reason of the greater area of exposed heating surface. When the improved tubing is used in a boiler after the manner of the ordinary tubes, it may be closely assembled to provide for the passage therebetween of the products of combustion with consequent expedition and efficiency in the generation of steam. The improved tubing also has a sufficient amount of flexibility to cause it to be beneficial in automobile radiator structures and to avoid loosening of the joints. Moreover, owing to the confined body of water in the contracted passages formed by the indentations 5 and 8, freezing of the water will not materially affect or injure the tubing in view of the fact that the volume of water is reduced within the said contracted passages and when frozen expansion will be effected into the portions of the passage through the tube having a greater area and for the further reason that there will be less frozen water in the said contracted passages, and the frozen water by reason of the same structural means may be readily thawed without in the least injuring the tubing or causing the latter to burst or in any manner weakening the improved tubing.

What is claimed as new is:

1. A tubing for the purposes specified having a passage completely therethrough for the circulation of water and formed with indentations alternately arranged in planes at right angles throughout the entire length thereof to provide contracted passages therein which also stand in planes at right angles and whereby the volume of water circulating through the tube may be reduced at intervals throughout the length of the tube.

2. A tubing for circulation of water therein having an open passage therethrough and indented at diametrically opposite points equally inwardly in planes at right angles in alternation throughout the length of the tube to provide constricted passages at intervals also in planes at right angles and which merge into other portions of the tube therebetween.

3. A tubing for circulation of water therethrough having constricted passages formed by equally indenting diametrically opposite portions of the tube alternately in planes at right angles to each other and producing narrow openings extending fully across the tube and having parallel walls.

4. A tubing for circulation of water therethrough having opposite portions thereof equally indented alternately in planes at right angles throughout the length thereof to provide constricted passages therethrough having parallel walls extending fully across the tube, the ends of the tube being always open and circular in cross section.

In testimony whereof I have hereunto set my hand in presence of two subscribing witnesses.

FRANK M. LA BOITEAUX.

Witnesses:
F. KUEBELKAMP,
GEO. H. KATTM.